United States Patent
Wendt et al.

(10) Patent No.: US 6,670,806 B2
(45) Date of Patent: Dec. 30, 2003

(54) MAGNETIC POSITION SENSOR FOR MEASURING LINEAR DISPLACEMENT

(75) Inventors: Matthias Wendt, Wuerselen (DE); Reinhold Elferich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/084,719

(22) Filed: Feb. 25, 2002

(65) Prior Publication Data

US 2002/0125884 A1 Sep. 12, 2002

(30) Foreign Application Priority Data

Feb. 23, 2001 (DE) .......................... 101 08 732

(51) Int. Cl.[7] .............. G01B 7/00; G01D 5/12; F16K 37/00; H01F 7/02
(52) U.S. Cl. .............. 324/207.24; 324/207.15; 324/207.2; 324/207.21; 324/207.22; 137/554; 335/302
(58) Field of Search ............ 324/207.13–207.24; 92/5 R; 137/554; 335/205–207, 302, 306; 200/81.9 M

(56) References Cited

U.S. PATENT DOCUMENTS

| | | | | |
|---|---|---|---|---|
| 4,107,604 A | * | 8/1978 | Bernier ............... | 324/207.2 |
| 4,422,041 A | * | 12/1983 | Lienau ............... | 324/207.23 |
| 4,793,241 A | * | 12/1988 | Mano et al. ......... | 92/5 R |
| 5,144,977 A | * | 9/1992 | Eggerton et al. ..... | 137/554 |
| 5,197,508 A | * | 3/1993 | Gottling et al. ...... | 137/1 |
| 5,399,967 A | * | 3/1995 | Carscadden .......... | 324/207.2 |
| 5,570,015 A | | 10/1996 | Takaishi et al. ....... | 324/207.21 |
| 6,097,183 A | * | 8/2000 | Goetz et al. ......... | 324/207.24 X |
| 6,411,081 B1 | * | 6/2002 | Spellman ............. | 324/207.21 |

FOREIGN PATENT DOCUMENTS

EP 0668118 A1 1/1995 .......... B23B/45/02

OTHER PUBLICATIONS

Goodrich et al; Linear motion clock and distance detector IBM Tech. Disclosure Bull. vol. 17, No. 12, p. 3699–3700, May 1975.*

* cited by examiner

Primary Examiner—Gerard R. Strecker
(74) Attorney, Agent, or Firm—Aaron Wakler

(57) ABSTRACT

The invention relates to a device with a magnetic position sensor comprising a field sensor (5) and analysis electronics (7) for linear displacements of a rod-shaped component (3), in particular the shaft of an actuator, with an element (M) generating a magnetic field (4) and a position sensor measuring the magnetic field strength angle of this field, the field angle signal determined by this sensor being used for displacement path determination. The element generating a magnetic field (4) is an axially magnetized magnet casing (M) which surrounds the rod-shaped component (3) of the actuator itself, is fixedly connected thereto and can rotate therewith about its displacement axis (z).

14 Claims, 4 Drawing Sheets

MAGNETIC POSITION SENSOR FOR MEASURING LINEAR DISPLACEMENT

FIELD OF THE INVENTION

The invention relates to a device with a magnetic position sensor comprising a field sensor and analysis electronics for linear displacements of a rod-shaped component, in particular the shaft of an actuator, with an element generating a magnetic field and a position sensor measuring the magnetic field strength angle of this field, the field angle signal determined by this sensor being used for displacement path determination.

BACKGROUND OF THE INVENTION

U.S. Pat. No. 5,570,015 discloses a magnetic position measurement device with which linear displacements of a rod-shaped component, for example a valve shaft, can be measured. A particular measurement unit, which consists of a shaft used for measurement purposes only and the position sensor, is placed on the rod-shaped component whose displacements are to be measured. Let into the shaft of the measurement unit is a rod-shaped magnet which generates a magnetic field in the longitudinal direction of the shaft. The position sensor is arranged fixedly in the area of the magnetic field. On relative displacements of the shaft in relation to its position, the position sensor measures by means of field sensors which, using analysis electronics, determine the magnetic field strength angle approximately proportionally to the displacement path. The path proportionality exists however only within a certain range.

Apart from the large space required, the drawback of this arrangement is that the shaft must not turn. If shielding is used, the device no longer works sufficiently linearly and is therefore no longer sufficiently precise.

SUMMARY OF THE INVENTION

It is an object of the invention to provide a device with a magnetic position sensor which is simpler and smaller in structure, but in particular performs its measurements contactlessly and directly on the rod-shaped component of the actuator.

According to the invention, this object is achieved in that the element generating a magnetic field is an axially magnetized magnet casing which surrounds the rod-shaped component of the actuator itself, is fixedly connected thereto and can rotate therewith about its displacement axis.

If the element generating the magnetic field is attached directly to the shaft of the actuator, there is no need for a separate shaft of the measurement unit. Another advantage is that the shaft can rotate about its own axis without this affecting the measurement. This is very important because, in this case, a round actuator shaft does not require a twist-resistant guide for measurement. For faultless operation, it is advantageous if the actuator shaft consists of a non-ferromagnetic or only a weakly ferromagnetic material. The position sensor is also applicable in the case of inaccessible shaft ends.

With regard to the magnet casing length there is a long measurement range. This allows a compact construction with a non-temperature-sensitive measurement principle. There is also a high linearity of correlation between position and measurement signal. An additional analysis device, using a sensor curve to increase the precision, can be dispensed with in this case.

In a further embodiment of the invention, the field sensor comprises magnetoresistive elements, Hall effect sensors or field coils.

For the measurement accuracy it may be desirable to change the magnetic field—although not during operation but in the context of certain configurations—in relation to that of a single magnet casing. In a further embodiment of the invention, the magnet casing consists of a magnetic material of preferably axially joined ring discs.

The assembly of discs allows further variants. In a further embodiment of the invention, the ring discs consist of materials having a different remanence.

If an assembly of discs is not desired, the magnet casing in a further embodiment of the invention is magnetized axially differently when consisting of a homogeneous magnetic material. In these forms of magnet casings, the measurement accuracy is considerably improved.

In a further embodiment of the invention, the magnet casing, either consisting of a homogeneous material or assembled from ring discs has a ratio of diameter to length ranging from 2/3 to 3/2, preferably in the proximity of 1, so as to form a minimum field strength.

In a further embodiment of the invention, the field sensors are arranged on the inner side of a casing-shaped screen. This screen may have a round or a square cross-section.

In a further embodiment of the invention, the whole position sensor i.e. both the field sensors and the analysis electronics, are situated within the screen. This combination is extremely simple and flexible.

In a further embodiment of the invention, the magnet casing is let into a ring-shaped recess of the rod-shaped component and the inlet casing is surrounded by a non-ferromagnetic shaft casing of greater length. The shaft casing can also be let into the rod-shaped component.

In a further embodiment of the invention, the rod-shaped component is surrounded by a non-ferromagnetic linear guide casing, in the casing opening of which it can slide with the magnet casing, and the non-ferromagnetic linear guide casing is surrounded by a casing-shaped screen within which the field sensor is situated.

In a further embodiment of the invention, the analysis electronics are arranged on the outer side of the screen and carry the sensors within the linear guide casing by means of a carrier guided through the screen.

In a further embodiment of the invention, the rod-shaped component in the area of the measurement device consists of two parts connected together by means of a central pin arrangement, and the magnet casing and the shaft casing are pushed onto the rod-shaped component in the area of the pin arrangement.

Thus, a very simple and suitable and compact measurement device is obtained which can be used favorably, in particular in the automotive sector.

BRIEF DESCRIPTION OF THE DRAWINGS

The invention will be elucidated with reference to the drawings.

DETAILED DESCRIPTION OF THE INVENTION

Figure 1:
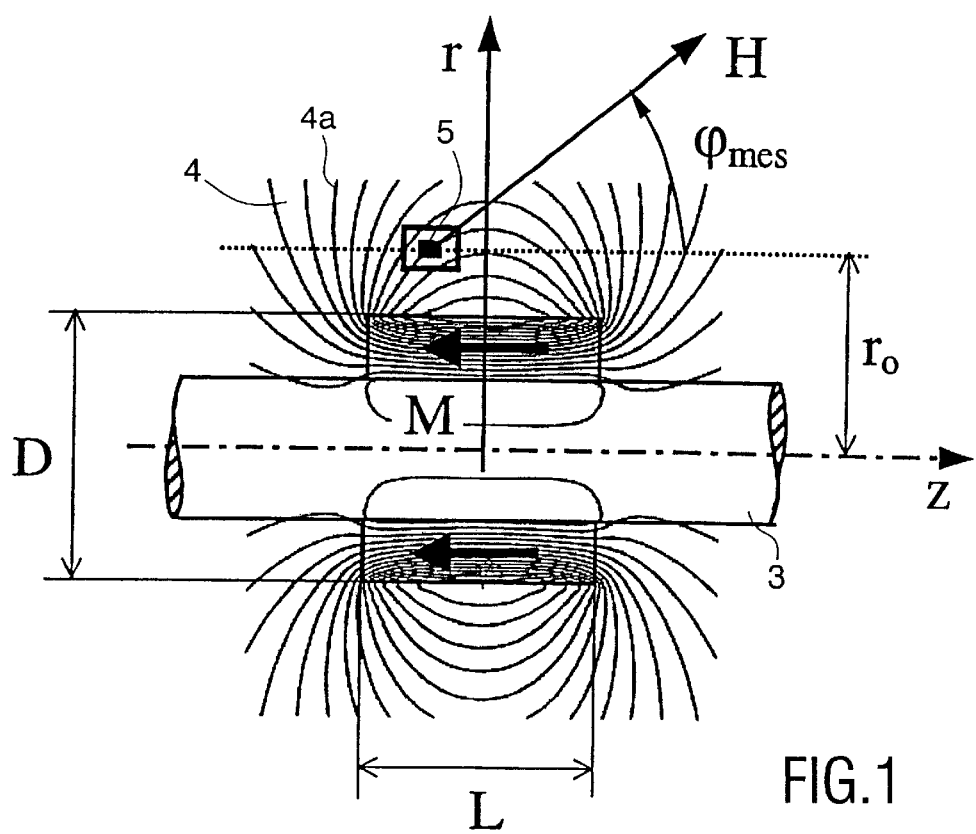
FIG. 1 is a diagram of a device with a magnetic position sensor according to the invention with a rod-shaped component, the axial displacements of which are determined by means of a magnet casing surrounding the component and fixedly connected thereto and a field sensor unit in the magnetic field of the magnet casing.

FIG. 1 shows a rod-shaped component, for example, the shaft 3 of a valve (not shown) which performs axial displacements. On the valve shaft 3 and fixedly connected thereto sits a magnet casing M which generates a magnetic field 4 made visible through the field lines 4a. The field lines 4a are lines of equal vector potential. A field sensor 5, which determines the magnetic field 4a prevailing around it, is arranged in the magnetic field 4. Along the shaft axis z, the shaft performs z linear displacements, where it can also rotate about the shaft axis z. The magnet casing M has a length L. The external diameter of the magnet casing is given as D. $r_0$ is the distance of field sensor 5 from the shaft axis z. The magnetization direction of the magnet casing lies in the axial direction marked z. The field sensors 5 and analysis electronics (not shown in FIG. 1) together form a position sensor.

The angle to be measured is $\phi_{mes}$. This is the angle of a magnetic field strength H in relation to the z-axis. The field sensor 5 emits field strength signals to analysis electronics (not shown), from which it determines the field angle which in turn corresponds ideally to the displacement path.

Figure 2A:
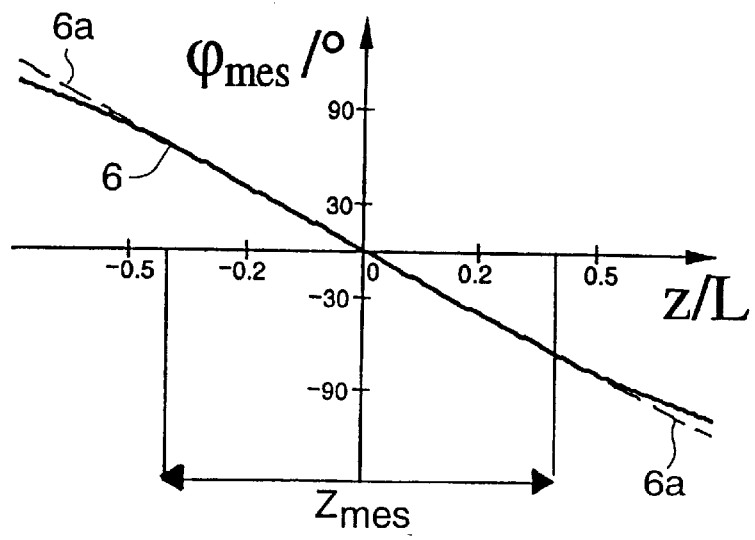
FIGS. 2a and 2b show curves of the measured angle on the path.
Figure 2B:
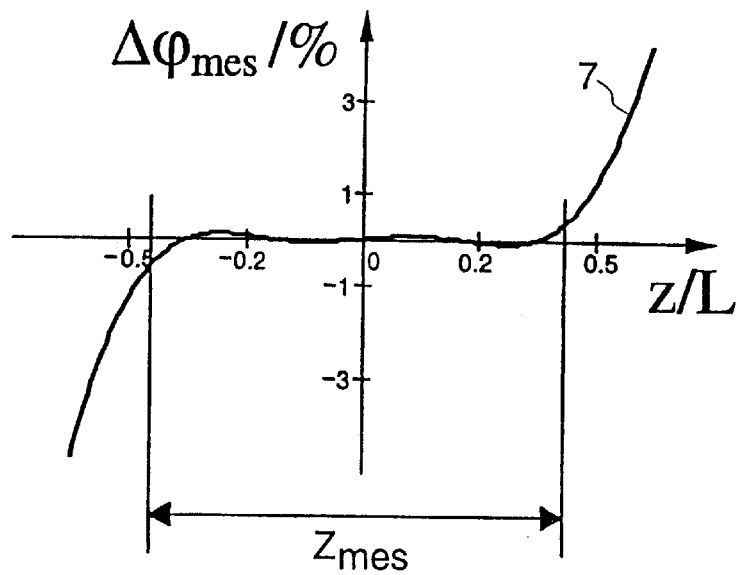

FIG. 2a shows in a solid-line curve 6 the measured field angle on the displacement path. The broken line 6a below it is the ideal line. It should be noted that the curve is essentially rectilinear as a function of the displacement path in the selected range $z_{mes}$ which corresponds to around 80% of the magnet length. FIG. 2b shows the measurement error in percent on the path with reference to a curve 7 showing that the measurement error in the range $z_{mes}$ is very low from around −0.4 to +0.4 (approx. 80% of the magnet length). This diagram shows the percentage measurement error $\Delta\phi_{mes}$ on the displacement path z/L.

FIGS. 2a and 2b show the situation in which no screening is required and present when the arrangement has been carefully selected. The magnet casing consists of an axially homogeneous material. In practice, it is often not possible to work without a screening, in particular when several measurement devices are operated in the immediate vicinity. Here the working results deteriorate. This deterioration can be compensated with an axially structured magnet casing M described with reference to FIG. 3.

Figure 3:
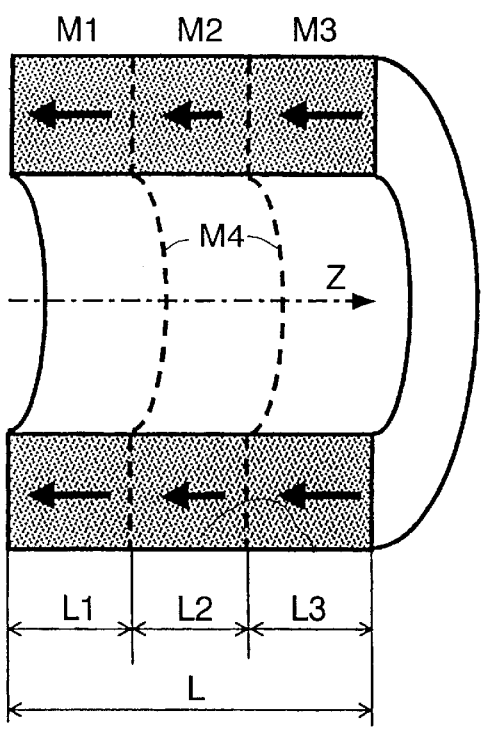
FIG. 3 shows a magnet casing composed of several ring bodies.

FIG. 3 shows a magnet casing M comprising three ring bodies M1, M2 and M3 joined together. The structure is symmetrical i.e. the axial lengths L1, L2 and L3 are equal. Here, different dimensions may of course also be selected. There are various possibilities of structuring the ring bodies M1, M2, M3. One possibility is to make them of a fully magnetized material of different remanence. Another possibility would be to make the individual ring bodies M1, M2, M3 of the same material and to magnetize them to different intensities. Another, preferable possibility is to use a magnet casing M of a uniform material and magnetize it to different intensities along the shaft axis z, using a suitable device. Further variants are also possible. Fewer than three ring bodies or more than three ring bodies are possible.

To achieve a casing length which is favorable with regard to measurement accuracy and achievable minimum field strength, the magnet casing, either consisting of a homogeneous material with axially modified magnetization or assembled from ring discs (M1, M2, M3) has a ratio of diameter to length ranging from 2/3 to 3/2, preferably in the proximity of 1, so as to form a minimum field strength.

Figure 4:
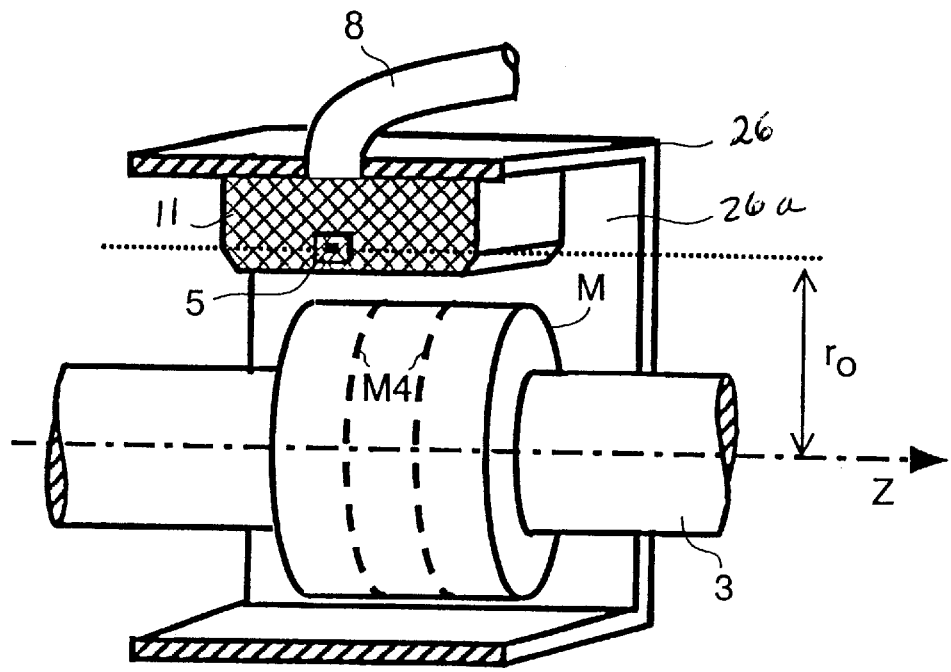
FIG. 4 is a cross-section of the measurement device with a screen, where the magnet casing consists of an axially homogeneous material or, as in FIG. 3, is assembled from several ring bodies, and where analysis electronics with field sensors are arranged within the screen.

FIG. 4 shows how the measurement device can be screened from external fields. FIG. 4 shows the shaft 3 with shaft axis z. If a magnet casing M of an axially homogeneous material (version in which the broken separating lines M4 must be ignored) sits on shaft 3, then the broken-line measurement error curve shown in FIG. 5 applies, which although representative, is not desirable. If, however, an axially structured magnet casing M of the three different ring bodies M1, M2, M3 as shown in FIG. 3 sits on shaft 3, the measurement error can be compensated so that the solid-line error curve shown in FIG. 5 is obtained which particularly complies with the requirements.

A screening plate 26 of a ferromagnetic material extends around the arrangement. The shaft 3 consists of a non-ferromagnetic or only a weakly ferromagnetic material. The whole position sensor with analysis electronics 11 on which the field sensor 5 is situated, is arranged on the inner side 26a of the screening plate 26. A connecting cable 8 transfers the position signals to a control device (not shown). The screening prevents interference fields from adjacent sensors or adjacent parts causing field distortions in the sensor area.

Figure 6:
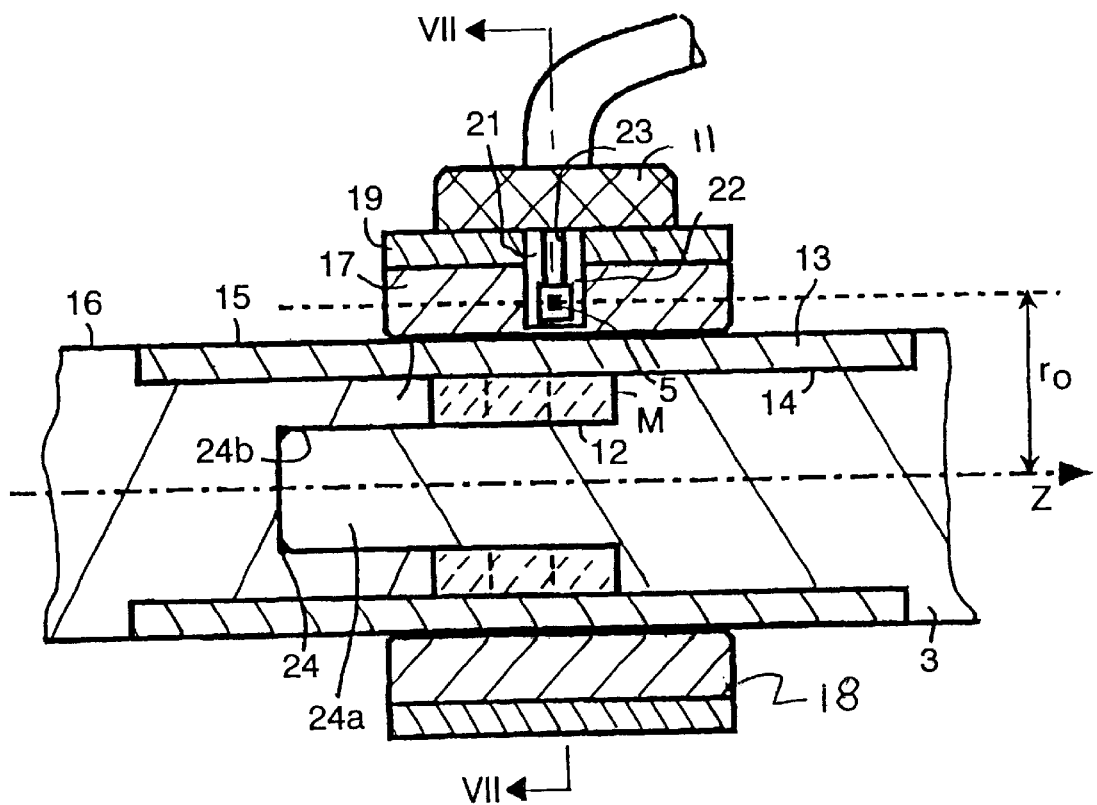
FIG. 6 shows a measurement device with a magnet casing integrated in the rod-shaped component and a very compact screened construction.

In contrast to FIG. 4, the shaft 3 may also have the structure shown in FIG. 6 with the magnet casing M let into the shaft 3. It is evident from the construction that the shaft 3 is freely rotatable in relation to the sensor without causing measurement value changes.

Figure 5:
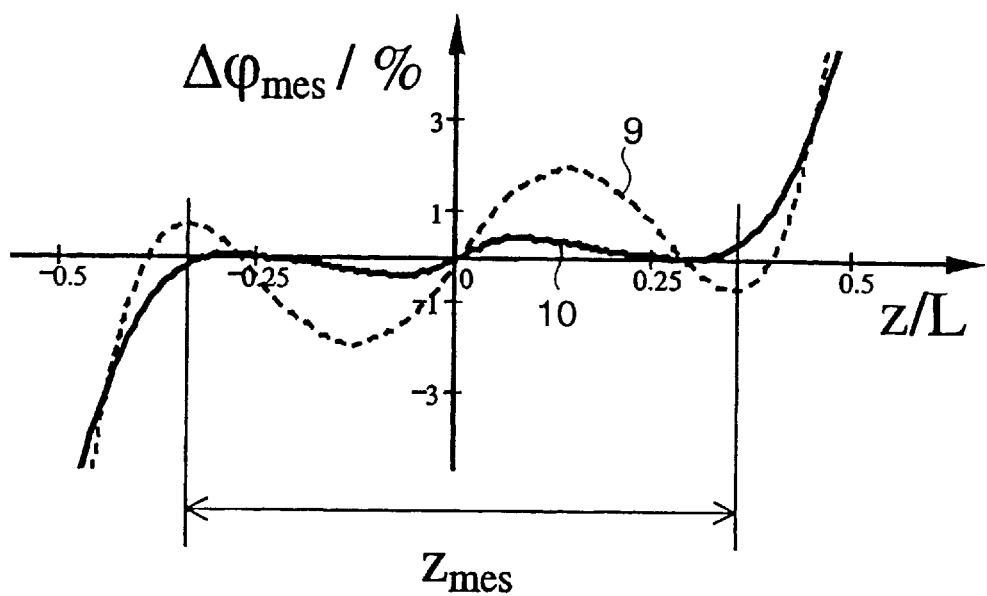
FIG. 5 is a diagram of the angle/path curve in the arrangement in FIG. 4 with a comparison of the measurement errors occurring during use of the different magnet casings.

FIG. 5 shows the diagram already indicated for percentage measurement errors. In the unscreened measurement device of FIG. 1, the broken-line error curve 9 is obtained. In the screened measurement device of FIG. 4, in which three magnetic ring bodies M1, M2, M3 or an axially variable magnetization distribution are used, the solid-line error curve 10 is obtained. In the diagram, the percentage measurement error $\Delta\phi_{mes}$ shown on the displacement path z/L, where the path is marked $z_{mes}$. In the configurations with an axially variable material or an axially variable magnetization, the measurement inaccuracy is reduced clearly quite considerably as compared with that shown in FIG. 2a.

Figure 7:
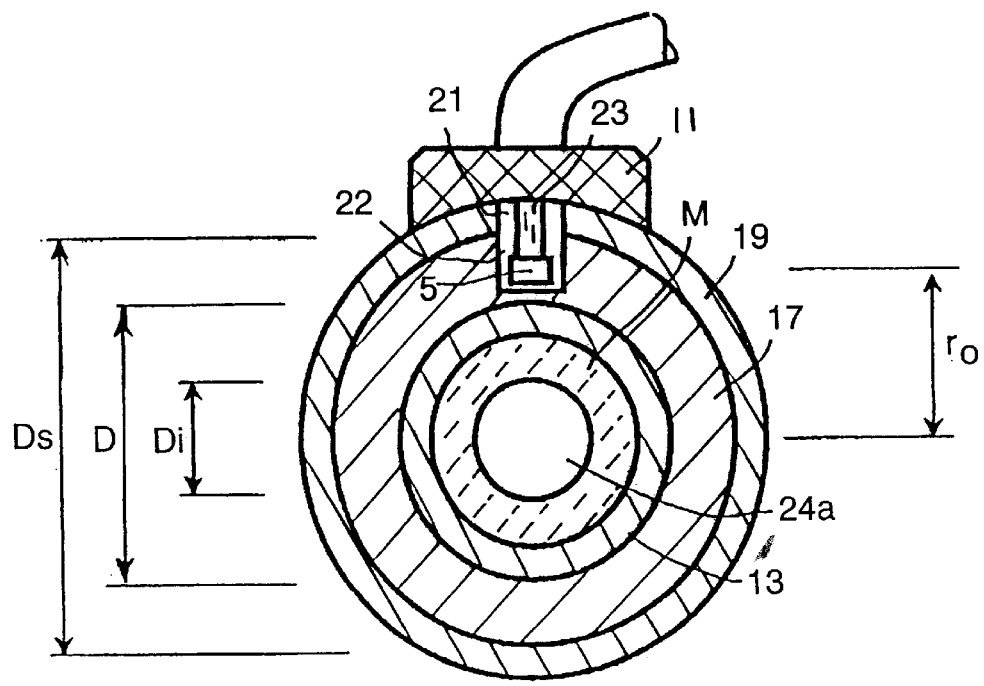
FIG. 7 is a section taken on the line VII—VII in the device shown in FIG. 6.

FIG. 6 shows another structure of the device in a longitudinal section. FIG. 7 is a cross-section of the device shown in FIG. 6, taken on the line VII—VII. The magnet casing M is let into a ring-shaped magnet recess 12 of the rod-shaped component 3, for example, the valve shaft 3. In this case, the magnet casing M may also consist of an axially homogeneous material, which is preferably structured axially magnetically, or it may consist of magnetic ring discs M1, M2, M3, where the number of three ring discs is merely an example. Similarly as in the other embodiments, only two or more than three ring discs may be used. The possible division into magnetic ring discs is indicated in FIG. 6. The inlet magnet casing M is surrounded by a non-ferromagnetic shaft casing 13 of greater length. This shaft casing 13 is inserted on the magnet casing M into a cover recess 14 overlaying its magnet recess 12. The outer wall 15 of the shaft casing 13 is preferably flush with the outer wall 16 of the valve shaft 3.

A linear guide casing 17 surrounds the valve shaft 3 shown in FIG. 6, which is freely displaceable and rotatable in the casing opening 18. The linear guide casing 17 consists of a non-ferromagnetic material. The linear guide casing 17 is surrounded by a casing-shaped screen 19 on which the analysis electronics 11 of the field sensor 5 are arranged. The screen 19 has an opening 21 extended as a blind hole 22 into the linear guide casing 17. Arranged on the analysis electronics 11 is a carrier 23 which retains the field sensor 5 in the blind hole 22 of the linear guide casing 17.

The valve shaft 3 within the shaft casing 13 has a central pin arrangement 24 which consists of a central pin 24a and a central recess 24b in which pin 24a engages. If the valve shaft 3 is extended, the magnet casing or casings M and the shaft casing 13 can easily be pushed on.

In all cases the field sensors 5 may be structured in known manner. It is possible to use paired magnetoresistive sensors, Hall effect sensors or field coils.

FIG. 7 is a section taken on the line VI—VI in the device of FIG. 6. The valve shaft 3 in the center of non-ferromagnetic or weakly ferromagnetic material is surrounded by the magnet casing or casings M, the shaft casing 13 and the linear guide casing 17. The linear guide casing 17 is surrounded by the screen 19. The analysis electronics 11 carry the field sensor 5 by means of carrier 21. The distance of the displacement axis z to the sensor 5 is given as $r_0$. Di is the internal diameter of magnet casing M. D is the external diameter of the magnet casing. Ds is the internal diameter of the screen 19. L is the axial length of the magnet casing. L1, L2, L3 are the lengths of the individual ring magnets M1, M2, M3 which together form the total axial length of the magnet casing M.

As an example of the device shown in FIGS. 6 and 7, the following dimensions can be given by way of example:

$r_0$=0.64D

L=D

Ds=2×D

L1=L2=L3

The magnetization of ring magnets M1 and M3 should be about 10% higher than the magnetization of M2.

What is claimed is:

1. A device for measuring linear displacement of a rod-shaped component, comprising:

an magnetic position sensor;

analysis electronics;

an element which generates a magnetic field, wherein the magnetic position sensor measures a magnetic field strength angle of the magnetic field, and a magnetic field strength angle signal determined by the magnetic position sensor is used by the analysis electronics for determining a displacement path, wherein the element which generates a magnetic field is an axially magnetized magnet casing which surrounds the rod-shaped component, is fixedly connected thereto, and rotates therewith about a displacement axis; and a ring-shaped recess of the rod-shaped component in which the element which generates a magnetic field is disposed, the element being surrounded by a non-ferromagnetic shaft casing of a greater length than that of the element.

2. A device as claimed in claim 1, characterized in that the rod-shaped component consists of a non-ferromagnetic or only a weakly ferromagnetic material.

3. A device as claimed in claim 1, characterized in that the magnetic position sensor comprises magnetoresistive elements.

4. A device as claimed in claim 1, characterized in that the magnetic position sensor comprises Hall effect sensors.

5. A device as claimed in claim 1, characterized in that the magnetic position sensor comprises field coils.

6. A device as claimed in claim 1, characterized in that the magnet casing consisting of a magnetic material consists of ring discs joined together.

7. A device as claimed in claim 6, characterized in that the ring discs consist of materials having a different remanence.

8. A device as claimed in claim 1, characterized in that the magnet casing is axially differently magnetized when consisting of a homogeneous magnetic material.

9. A device as claimed in claim 1, characterized in that the magnet casing either consisting of a homogeneous material or assembled from ring discs has a ratio of diameter to length ranging from 2/3 to 3/2, preferably in a proximity of 1, so as to form a minimum field strength.

10. A device as claimed in claim 1, characterized in that a field the magnetic position sensor is arranged on an inner side of a casing-shaped screen.

11. A device as claimed in claim 1, characterized in that the analysis electronics and the magnetic position are situated within a screen.

12. A device as claimed in claim 1, characterized in that the shaft casing is also disposed in the rod-shaped component.

13. A device as claimed in claim 1, characterized in that the analysis electronics are arranged on an outer side of a screen and carry the magnetic position sensor within a linear guide casing by means of a carrier guided through the screen.

14. A device as claimed in claim 1, characterized in that the rod-shaped component in the an area of measurement of the device consists of two parts connected together by means of a central pin arrangement and in that the magnet casing and the shaft casing are pushed onto the rod-shaped component in an area of the central pin arrangement.

* * * * *